(12) United States Patent
Hådén et al.

(10) Patent No.: US 9,878,795 B2
(45) Date of Patent: Jan. 30, 2018

(54) DE-ICING ARRANGEMENT AND METHOD FOR DE-ICING A STRUCTURAL ELEMENT

(71) Applicant: SAAB AB, Linköping (SE)

(72) Inventors: Bertil Hådén, Linköping (SE); Mats Bäckström, Linköping (SE)

(73) Assignee: SAAB AB, Linköping (SE)

( * ) Notice: Subject to any disclaimer, the term of this patent is extended or adjusted under 35 U.S.C. 154(b) by 100 days.

(21) Appl. No.: 14/650,012

(22) PCT Filed: Dec. 6, 2012

(86) PCT No.: PCT/SE2012/051351
§ 371 (c)(1),
(2) Date: Jun. 5, 2015

(87) PCT Pub. No.: WO2014/088481
PCT Pub. Date: Jun. 12, 2014

(65) Prior Publication Data
US 2015/0314879 A1   Nov. 5, 2015

(51) Int. Cl.
*B64D 15/12* (2006.01)
*B64D 15/16* (2006.01)

(52) U.S. Cl.
CPC ........ *B64D 15/163* (2013.01); *B64D 15/12* (2013.01)

(58) Field of Classification Search
CPC .... B65D 15/163; B65D 15/12; B64D 15/163; B64D 15/12; H01L 41/042; F03D 80/40
See application file for complete search history.

(56) References Cited

U.S. PATENT DOCUMENTS 3,549,964 A * 12/1970 Afanasov ............. B64D 15/163
244/134 A
4,875,644 A  10/1989 Adams et al.
(Continued)

FOREIGN PATENT DOCUMENTS

GB    2251417 A    7/1992

OTHER PUBLICATIONS

PCT/ISA/210—International Search Report—dated Sep. 9, 2013 (Issued in Application No. PCT/SE2012/051351).
(Continued)

*Primary Examiner* — Philip J Bonzell
(74) *Attorney, Agent, or Firm* — Venable LLP; Jeffri A. Kaminski (57) ABSTRACT

A de-icing arrangement and method for de-icing a structural element. The arrangement includes at least one electromagnetic actuator, a capacitive storage bank, a control unit arranged to provide an excitation pulse to the at least one electromagnetic actuator, and a charging circuit arranged to charge the capacitive storage bank. The at least one electromagnetic actuator is arranged to expand in at least one direction when fed with the excitation pulse. The at least one electromagnetic actuator is placed in relation to the structural element so as to apply a mechanical force caused by the expansion on the structural element. The capacitive storage bank includes a plurality of selectable capacitors of different size. The control unit is arranged to select at least one capacitor for charging having a size such that current discharge of the capacitive storage bank into the at least one electromagnetic actuator generates a desired distribution between heat and mechanical power.

16 Claims, 4 Drawing Sheets

(56) References Cited

U.S. PATENT DOCUMENTS

| | | | |
|---|---|---|---|
| 4,895,322 A | 1/1990 | Zieve | |
| 4,982,121 A | 1/1991 | Lardiere, Jr. et al. | |
| 5,143,325 A * | 9/1992 | Zieve | B64D 15/163 |
| | | | 244/134 D |
| 5,553,815 A | 9/1996 | Adams et al. | |
| 5,782,435 A | 7/1998 | Ingram et al. | |
| 6,283,411 B1 | 9/2001 | Giamati et al. | |
| 7,708,227 B2 * | 5/2010 | Al-Khalil | B64D 15/12 |
| | | | 244/134 A |
| 9,016,633 B2 * | 4/2015 | Asfia | B64D 15/02 |
| | | | 244/134 R |
| 2007/0170312 A1 * | 7/2007 | Al-Khalil | B64D 15/12 |
| | | | 244/134 A |
| 2009/0072091 A1 * | 3/2009 | Al-Khalil | B64D 15/12 |
| | | | 244/134 A |
| 2012/0091276 A1 | 4/2012 | Al-Khalil | |

OTHER PUBLICATIONS

PCT/ISA/237—Written Opinion of the International Searching Authority—dated Sep. 26, 2013 (Issued in Application No. PCT/SE2012/051351).

Supplementary European Search Report—dated Jun. 23, 2016 (Issued in Application No. EP12889643).

\* cited by examiner

DE-ICING ARRANGEMENT AND METHOD FOR DE-ICING A STRUCTURAL ELEMENT

CROSS-REFERENCE TO RELATED APPLICATIONS

The application is the national phase under 35 U.S.C. §371 of PCT/SE2012/051351 filed 6 Dec. 2012.

TECHNICAL FIELD

The present invention relates to a de-icing arrangement and method for de-icing a structural element by means of at least one electromagnetic actuator.

BACKGROUND ART

Aircrafts are continuously exposed to varying climatic conditions and in this regard, ice accretion is a threatening event. Ice accretion is known to cause serious perturbations to the flying conditions due to ice formations on aerodynamic surfaces of aircraft.

Ice accretion on aircrafts is a very complex physical process. The selection of an adequate ice rejection technique is thus a difficult task. The technique to be selected must be made compatible with a number of constraints comprising material properties, fatigue, dynamic deformation while in flight, repairing and servicing constraints, durability etc, just to name a few.

One of the issues is the growing need for fuel consumption reductions. Especially when using electromechanical de-icing systems (EMEDS) also the power output for driving the de-icing system is an issue and it is desirable to minimize the peak power output for the electro-mechanical de-icing system.

Electromechanical de-icing systems use current induced magnetic effects that result either in surface vibrations or strong pulses to effect de-icing.

U.S. Pat. No. 5,782,435 relates to a de-icing system that uses electromagnetic actuators mounted within the airfoil of an aircraft to effect de-icing.

U.S. Pat. No. 5,553,815 describes a de-icer module using a bank of capacitors.

SUMMARY OF THE INVENTION

One objective of the present invention is to provide an improved de-icing of a structural element, such as a wing of an aircraft or a blade of a wind power installation.

This objective has been achieved by means of a de-icing arrangement for de-icing a structural element, said de-icing arrangement comprising:
  at least one electromagnetic actuator,
  a capacitive storage bank,
  a control unit arranged to provide an excitation pulse to the at least one electromagnetic actuator, and
  a charging circuit arranged to charge the capacitive storage bank.

The at least one electromagnetic actuator is arranged to expand in at least one direction when fed with the excitation pulse. The at least one electromagnetic actuator is further arranged in abut relation to said structural element so as to apply a mechanical force on the structural element caused by the expansion. The capacitive storage bank comprises a plurality of selectable capacitors of different capacitance. The control unit is arranged to select at least one capacitor for charging having a total capacitance such that current discharge of the capacitive storage bank into the at least one electromagnetic actuator generates a desired distribution between heat and mechanical power. In one example, the control unit is arranged to control discharge of the at least one capacitor to be entirely discharged to provide the excitation pulse to the at least one electromagnetic actuator. In an alternative example, the control unit is arranged to control discharge of the at least one capacitor so as to cut off the discharge after a predetermined time to provide the excitation pulse to the at least one electromagnetic actuator.

With the arrangement above the distribution between generation of mechanical force and heat can be controlled. Further, with the arrangement above, the power required for each electromagnetic pulse though the structural element can be reduced. Thereby, the use of available power can be optimized to increase the performance of the de-icing.

Further, performance of a platform exposed to harsh weather conditions giving rise to ice accretion, can be improved. For example, problems with melted ice flowing over the structural element, which melted ice risks freezing in ice accretion formations on the structural element, can be reduced as heating can be minimized with the selection of the capacitor(s) discharged for providing the excitation pulse.

In one option, the control unit is arranged to determine an output voltage/current from the charging circuit based on the selected at least one capacitor so that the excitation pulse provided by means of said at least one selected capacitor has a predetermined maximum current/voltage peak and to control the charging circuit to output the determined output voltage/current. Thereby, irrespectively of the capacitance of the capacitor(s) of the selected capacitor set-up, the control unit can control and ensure that an excitation pulse will be provided which has enough mechanical power to break the ice and thus provide de-icing.

The control unit may be arranged to control the charging of the capacitive storage bank for a plurality of consecutive excitation pulses provided during a predetermined time period so that the at least one electromagnetic actuator generates the desired distribution between heat and mechanical power during said time period.

In one option, the control unit is arranged to select capacitors based on at least one of the following parameters: temperature, humidity, ice thickness at the structural element, ice thickness growth, speed and altitude.

In one option, the control unit is arranged to control current discharge of the capacitive storage bank into the at least one electromagnetic actuator so as to abort the excitation pulse (p) at a predetermined timing (t_abort) after start of the excitation pulse. The predetermined timing may be selected so as to substantially coincide with the timing for a change of direction of the excitation pulse current. The predetermined timing may be selected at the first change of direction of the current of the excitation pulse.

In one option, the control unit is arranged to operate in at least two modes of operation, wherein in the first mode de-icing is performed mainly mechanically by means of the excitation pulse. In a second mode of operation, de-icing is performed both mechanically and thermally. The thermal de-icing is provided by heating the structural element by means of the electromagnetic actuator. In the first mode a set of capacitances is selected having a smaller total (or resulting) capacitance than in the second mode.

The structural element comprises in one option a base forming a support for the at least one electromagnetic actuator and a flexible skin, wherein the at least one electromagnetic actuator is arranged in relation to the flexible skin so as to apply the force on the flexible skin at the expansion of the electromagnetic actuator.

One embodiment of the present invention relates to a structural element having at least one de-icing arrangement as described above.

Another embodiment of the present invention relates to an aircraft provided with at least one such structural element having at least one de-icing arrangement.

Yet another embodiment of the present invention relates to a wind power turbine provided with at least one such structural element having at least one de-icing arrangement.

Still yet another embodiment of the present invention relates to a method for de-icing a structural element. The method comprises the step of providing an excitation pulse to at least one electromagnetic actuator, whereby the at least one electromagnetic actuator is expanded in at least one direction in response to the received excitation pulse, wherein the at least one electromagnetic actuator is arranged in an abutting relation to said structural element so as to, when expanded, apply a force on the structural element.

The method further comprises the steps of selecting from a capacitive storage bank comprising a plurality of selectable capacitors of different capacitance, at least one capacitor, and charging the selected at least one capacitor. The step of providing an excitation pulse to at least one electromagnetic actuator comprises discharging the charged at least one capacitor into the at least one electromagnetic actuator. The selecting step comprises selecting at least one electromagnetic capacitor having a total capacitance such that the subsequent current discharge to provide the excitation pulse generates a desired distribution between heat and mechanical power.

In one option, the method further comprises the step of determining a charging current/voltage based on the selected at least one capacitor and based on information related to a desired peak current of the excitation pulse, wherein the charging of the selected at least one capacitor is performed with the determined charging current/voltage.

One embodiment of the invention relates to a computer program comprising a program code for de-icing a structural element, comprising the step of providing an excitation pulse to at least one electromagnetic actuator, whereby the at least one electromagnetic actuator is expanded in at least one direction in response to the received excitation pulse, wherein the at least one electromagnetic actuator is arranged in an abutting relation to said structural element so as to, when expanded, apply a force on the structural element. The program code comprises further the steps of selecting from a capacitive storage bank comprising a plurality of selectable capacitors of different capacitance, at least one capacitor, and charging the selected at least one capacitor. The step of providing an excitation pulse to at least one electromagnetic actuator comprises discharging the charged at least one capacitor into the at least one electromagnetic actuator. The selecting step comprises selecting at least one electromagnetic capacitor having a total capacitance such that the subsequent current discharge to provide the excitation pulse generates a desired distribution between heat and mechanical power.

One another embodiment of the present invention related to a computer program product comprising a program code stored on a computer readable media for de-icing a structural element, comprising the step of providing an excitation pulse to at least one electromagnetic actuator, whereby the at least one electromagnetic actuator is expanded in at least one direction in response to the received excitation pulse, wherein the at least one electromagnetic actuator is arranged in an abutting relation to said structural element so as to, when expanded, apply a force on the structural element. The program code comprises further the steps of selecting from a capacitive storage bank comprising a plurality of selectable capacitors of different capacitance, at least one capacitor, and charging the selected at least one capacitor. The step of providing an excitation pulse to at least one electromagnetic actuator comprises discharging the charged at least one capacitor into the at least one electromagnetic actuator. The selecting step comprises selecting at least one electromagnetic capacitor having a total capacitance such that the subsequent current discharge to provide the excitation pulse generates a desired distribution between heat and mechanical power.

DETAILED DESCRIPTION

A de-icing arrangement for de-icing a structural element comprises at least one actuator for removing ice from the structural element, a capacitive storage bank and a control unit arranged to control discharge of the capacitive storage bank to provide an excitation pulse to the at least one electromagnetic actuator so as to force the actuator to apply a mechanical force on the structural element so as to provide a chock in the structural element. This may result in removal of ice from the structural element. The actuator is arranged to expand in at least one direction when fed with the excitation pulse. The actuator is arranged in relation to the structural element so that mechanical force caused by the expansion on the structural element will be applied to the structure element.

The capacitive storage bank comprises a plurality of selectable capacitors of different capacitance. The control unit is arranged to select at least one capacitor for charging having a total capacitance such that current discharge of the capacitive storage bank into the at least one electromagnetic actuator generates a desired distribution between heat and mechanical power. The control unit may further be arranged to control cutoff of discharge of the capacitive storage bank and thus controlling abortion of the excitation pulse into the at least one electromagnetic actuator so as to generate the desired distribution between heat and mechanical power. The control unit is in one example arranged to determine an output voltage/current from a charging circuit based on the selected at least one capacitor so that the excitation pulse provided by means of said at least one selected capacitor has a predetermined maximum current/voltage peak and to control the charging circuit to output the determined output voltage/current.

The energy delivered by the capacitive storage bank is translated into mechanical force and into heat in the actuators. Analysis of test data has indicated that a substantial part of the delivered energy is normally translated into heat. Empirical data shows that the ice is blasted away at an early stage of the discharge process. The ice is blasted away as a result of the operation of the actuator. In detail, the ice may be blasted away as a result of the operation of the actuator mainly caused by the leading edge and the peak of the current curve of the excitation pulse. This impact is obtained from the start of the discharge until about the peak of the pulse. During the reminder of the pulse, mainly all the energy is translated into heat. The heat is heating the structural element. To sum up, the peak value of the current to the actuator(s) and the derivative of the current curve are parameters which determine the effect of the mechanical pulse.

Accordingly, if the tail of the pulse to the actuator is made small, the same mechanical force can still be applied on the structure as if the pulse had a long tail. In some situations, for example at temperatures around zero or a few degrees centigrade, the heating of the structure can even be harmful. The heating may then result in problems with melted ice flowing over the structural element, which melted ice risks freezing in ice accretion formations on the structural element.

Thus, with control of the excitation pulse described above using selected capacitor(s), controlling at least the peak current and possibly also by cutting off the excitation pulse, the mechanical power provided by the arrangement can largely be separated from heat. Therefore the control unit can control the distribution between forming mechanical power and heat. Thus, the distribution between mechanical power and heat can be controlled for de-icing purposes. The benefits from this become even more apparent when de-icing is performed during a time period, wherein a plurality of excitation pulses are controlled during this time period so as to perform the de-icing using a desired distribution between heat and mechanical power.

In practice, it would not be possible to generate only mechanical power and no heat at all. The electromagnetic actuators are generally heated during the time period for performing de-icing and this may be taken into account when controlling the excitation pulses so as to provide the desired distribution between heat and mechanical power. The desired distribution between heat and mechanical power can be adapted to the circumstances, for example weather conditions, ice thickness, ice growth etc, at a particular time. In one example, the desired distribution between heat and mechanical power is determined based on ice growth and temperature.

The actuator is for example an electromagnetic actuator. The circuitry of the actuator has characteristically an ohmic resistance R, an inductance L and a capacitance C.

Further, as stated above, a charging circuit is arranged to charge the capacitive storage bank. When used in a platform having a plurality of de-icing arrangements powered by a plurality of charging circuitries, the power and/or energy output required for powering the de-icing arrangements can be a limiting factor. When reducing the development of heat, less energy may be required and charging time can thereby be reduced. This in turn has the effect that the number of mechanical pulses can be increased when there is a limit for the power output. Further the power peak can be decreased or the efficiency of the system can be increased due to the decreased powering of the capacitive storage banks. Further, the energy consumption can also be decreased. The capacitive storage banks may be charged after each excitation pulse or after a plurality of excitation pulses.

Figure 1:
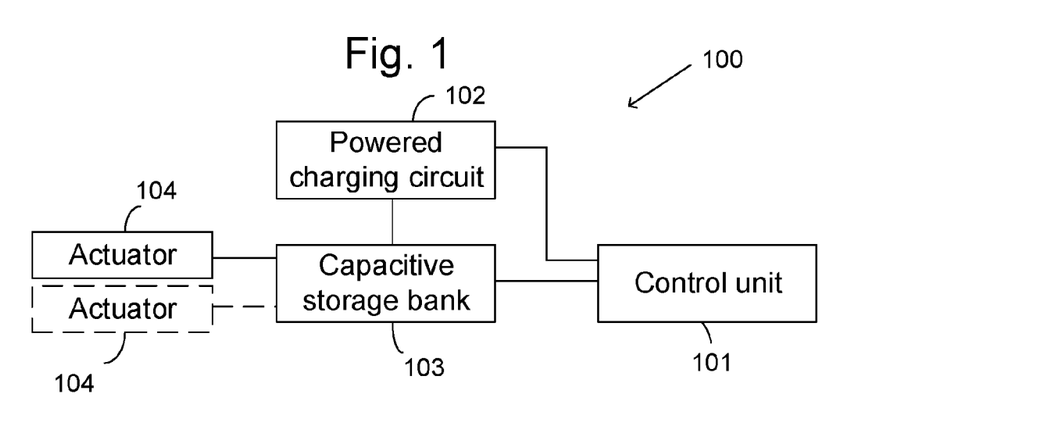
FIG. 1 shows a schematic block scheme of a first example of a de-icing arrangement.

In the exemplary embodiment of FIG. 1, a de-icing arrangement 100 comprises at least one electromagnetic actuator 104, a capacitive storage bank 103, a control unit 101 arranged to control discharge of the capacitive storage bank to provide an excitation pulse p to the at least one electromagnetic actuator, and a charging circuit 102 arranged to charge the capacitive storage bank 103. The charging circuit is powered. The charging circuit 102 may be controlled by the control unit 101. The at least one electromagnetic actuator 104 is arranged to expand in at least one direction when fed with the excitation pulse. The at least one electromagnetic actuator 104 is placed in relation to said structural element so as to apply a mechanical force caused by the expansion on the structural element.

The structural element can be used in many applications, aeronautical or not. In one example, the structural element is incorporated in a stationary application, such as a wind power plant.

The capacitive storage bank 103 comprises a plurality of selectable capacitors of different capacitance. The control unit 101 is arranged to select at capacitor set-up least one capacitor for charging. The selection is made such that the capacitor(s) has a total capacitance such that current discharge of the capacitive storage bank into the at least one electromagnetic actuator generates a desired distribution between heat and mechanical power.

Figure 2A:
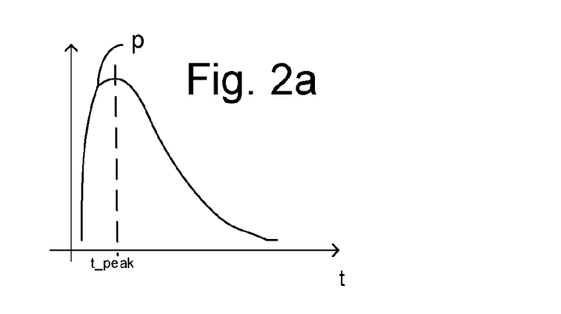
FIGS. 2a-2b show graphs illustrating examples of current curves provided by a capacitive storage bank of the de-icing arrangement of FIG. 1.
Figure 2B:
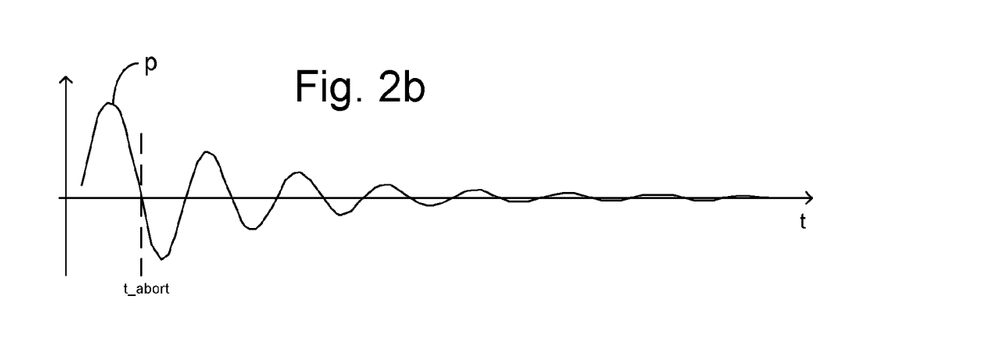

As illustrated in the exemplary current pulse curves of FIGS. 2a to 2c, the capacitive storage bank comprises a plurality of capacitors having different discharge curves giving rise to different excitation pulses. The slope of the curves depends on the capacitance of the selected capacitor set-up of the capacitive storage bank. FIG. 2a, showing a discharge curve having a slow slope and FIG. 2c illustrates an under-damped discharge curve. The capacitance C giving rise to the under-damped discharge curve is smaller than the capacitances giving rise to the discharge curves of FIG. 2a. Thereby, the excitation pulse has an under-damped character. The under-damped curve may be substantially periodic, damped and converge to zero. If it is desirable to cut off the discharge curve before it is completely attenuated, it may be beneficial to abort the curve at a zero crossing, when the current changes direction. Thereby, the risk of sparking is minimized since the derivative of the current dI/dt and thus the current induced in a switch or the like used for aborting the pulse, is minimized. In one example, the under-damped curve is cut-off at the first zero crossing. In this example, only the first peak of the current curve, which first peak has the highest peak value is provided to the actuator(s).

The discharge curves giving rise to the excitation pulses can be illustrated in relation to the operation of the electromagnetic actuator. Accordingly, the control unit can in one example be arranged to control the selection of capacitance(s) and potentially also the cut-off of the discharge curve based on the expansion of the electro-magnetic actuator. If a minimum of heat is desired, the capacitances are selected to retain a minimum of energy after the expansion of the at least one electromagnetic actuator has been completed.

The control unit 101 is in an alternative or complementing example arranged to control the discharge curves giving rise to the excitation pulses so that substantially no mechanical force is cut away. If little or no heat is desired, the selection of capacitance(s) and potentially also the cutoff of the discharge curve is controlled so that substantially no mechanical force is cut away while at the same time a minimum of heat is generated. Thus the selection of capacitance(s) and potentially also the cutoff of the discharge curve is controlled such that substantially no mechanical force is cut away while at the same time the pulse is aborted as soon as possible.

The control unit is in one example arranged to operate in at least two modes of operation. In the first mode, de-icing is performed mainly mechanically. In this mode, the control unit is arranged to select one or a plurality of capacitors providing a current curve having a steep slope, i.e. a high time derivative (dI/dt). In the second mode of operation, de-icing is performed mechanically and thermally. Thermal de-icing is then provided by heating the structural element by means of the electromagnetic actuator. Accordingly, the control unit is arranged to select one or a plurality of capacitors having a slow slope, i.e. a low time derivative (dI/dt). Thus, in the first mode, a set of interconnected capacitances is selected having a smaller total capacitance than in the second mode.

The control unit is in one example arranged to control the electromagnetic actuator based on at least one of the following parameters: temperature, humidity, ice thickness at the structural element and ice thickness growth. The control unit then is arranged to receive sensor data and/or pre-processed sensor data related to at least one of these parameters and optionally perform calculations so as to provide at least one of these parameters. A plurality of modes of operation can be determined, each associated to one or a plurality of capacitors of a suitable total capacitance based on the at least one parameter: temperature, humidity, ice thickness at the structural element and ice thickness growth. In one example, one mode is determined for each situation.

The control unit is in one example arranged to control the capacitive storage bank for a plurality of consecutive excitation pulses so that the at least one electromagnetic actuator generates a desired distribution between heat and mechanical power. The desired distribution between heat and mechanical power can be adapted to the circumstances. For example, weather conditions, ice thickness, ice growth etc, at a particular time can be taken into account when determining the desired distribution between heat and mechanical power. Thus, the control unit may be arranged to calculate the desired distribution between heat and mechanical power based on sensor data and/or calculated data. The control unit may further be arranged to determine a desired sequence of excitation pulses formed by discharge of one or a plurality of selected capacitors. Thereupon de-icing can be performed based on the desired sequence of excitation pulses and the predetermined selection of capacitor(s) associated to each excitation pulse of the sequence.

In one example, the capacitive storage bank is charged between each pulse. In an alternative example, a plurality of pulses are executed between charging by means of the charging circuit.

As it is possible to control the pulses to the actuators and to control the distribution between generating mechanical power, the control unit can be arranged to control the de-icing for optimized use of available power and/or energy, as is clear from above. The benefits from this become especially apparent considering the powering of a system including charging circuits arranged to charge a plurality of capacitive storage banks, wherein each capacitive storage bank in turn may power a plurality of actuators distributed over a platform.

Figure 3:
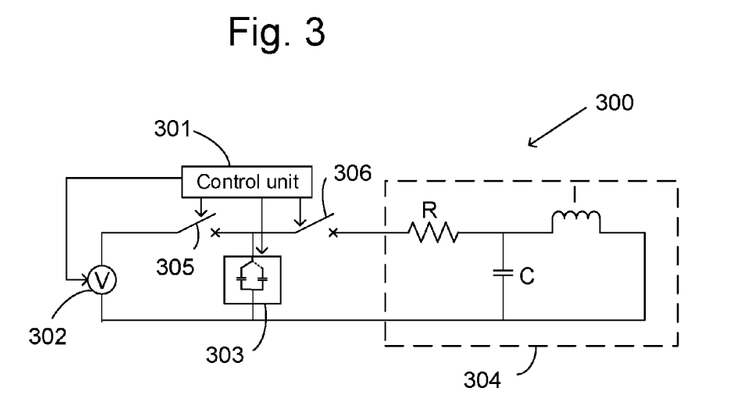
FIG. 3 shows a schematic block scheme of a second example of a de-icing arrangement.

In the exemplary embodiment of FIG. 3 of a de-icing arrangement 300, the de-icing arrangement 300 comprises at least one electromagnetic actuator 304, having an ohmic resistance R, an inductance L and a capacitance C. The de-icing arrangement further comprises a capacitive storage bank 303 and a powered charging circuit 302 arranged to charge the capacitive storage bank 303. A control unit 301 is arranged to control charging of the capacitive storage bank 303 by means of the charging circuitry 302. The control unit 301 is further arranged to control discharge of the capacitive storage bank to provide an excitation pulse to the at least one electromagnetic actuator.

In the illustrated example, the control unit 301 is arranged to control a first switch 305 so that the charging circuit is arranged to charge the capacitive storage bank when the first switch is closed. When the first switch is open, the capacitive storage bank is not charged. The control unit 301 is further arranged to control a set-up of capacitors by means of one of a plurality of selectors (not shown in FIG. 3) for controlled charging and/or discharging of one or a plurality of selected capacitors of the capacitive storage bank. The control unit is further arranged to control a second switch 306 so that one or a plurality of capacitors of the capacitive storage bank, selected by the selector(s) of the capacitive storage bank is discharged when the second switch 306 is closed. When the second switch 306 is open, the capacitive storage bank is not discharged. The first and second switches 305, 306 and possibly also the selector(s) are designed to operate at high currents. Further, the first and second switches and the selector(s) may be designed with regard to heating and/or sparks. The control unit is further arranged to determine an output voltage/current from the charging circuit based on the selected at least one capacitor so that the excitation pulse provided by means of said at least one selected capacitor has a predetermined maximum current/voltage peak t_peak and to control the charging circuit to output the determined output voltage/current. The control unit 301 is not described more in detail here but it operates in an equivalent manner as the control unit 101 described in relation to FIGS. 1 and 2.

The at least one electromagnetic actuator 304 can be formed in many ways known to the person skilled in the art. In one example, the at least one electromagnetic actuator 304 is arranged to expand in at least one direction when fed with the excitation pulse. The at least one electromagnetic actuator 304 is in accordance with this example placed in relation to said structural element so as to apply a mechanical force caused by the expansion on the structural element.

Figure 4A:
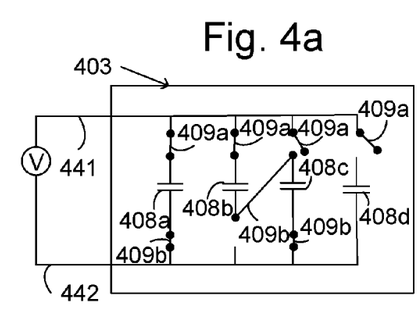
FIG. 4a shows schematically an example of capacitive storage bank of a deicing arrangement when connected to a charging circuit.
Figure 4B:
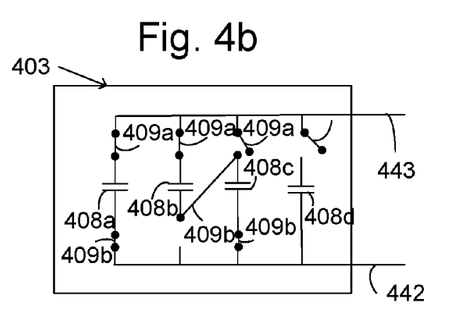
FIG. 4b shows schematically an example of capacitive storage bank of a deicing arrangement when connected to at least one electromagnetic actuator.

In FIGS. 4a and 4b, a capacitive storage bank 403 is illustrated arranged to provide an excitation pulse to an electro-magnetic actuator. The capacitive storage bank 403 comprises a plurality of capacitors 408a, 408b, 408c, 408d. The capacitive storage bank 403 further comprises one or a plurality of selectors 409a, 409b set for the selected capacitor set-up. In the illustrated example, the capacitive storage bank comprises one selector 409a associated to each capacitor in the current path before each capacitor. The capacitive storage bank comprises further a selector 409b associated to each capacitor in the current path after each capacitor. The selector 409b associated to each respective capacitor in the current path after the capacitor can be connected either to a ground line 442 or to the input to one of the other capacitors. Thereby a parallel alternatively a serial coupling of capacitors can be provided. The selectors 409a, 409b are controlled by the control unit to provide the selected capacitor set-up with the desired total capacitance.

FIG. 4a represents a situation, wherein the first switch 305 is closed thus providing an electrical circuit including the charging circuit and the capacitive storage bank. The selectors are then arranged to connect an input line 441 to the capacitive storage bank from the charging circuit to the at least one selected capacitor and back to ground 442. In one example, one capacitor is selected. In an alternative example, a plurality of capacitors are selected either in parallel or in series in accordance with the selected set-up of the capacitors.

FIG. 4b represents a situation, wherein the second switch 306 is closed thus providing an electrical circuit including the capacitive storage bank and the at least one electromagnetic actuator. An output line 443 from the capacitive storage bank 403 is then electrically connected to the at least one electromagnetic actuator. With this electrical coupling, the charged capacitors discharges into the electromagnetic actuator(s).

The selectors 409a, 409b are in the illustrated example of FIGS. 4a and 4b are formed as a switches. The switches may for example be mechanical switches or semiconductor switches.

Figure 5:
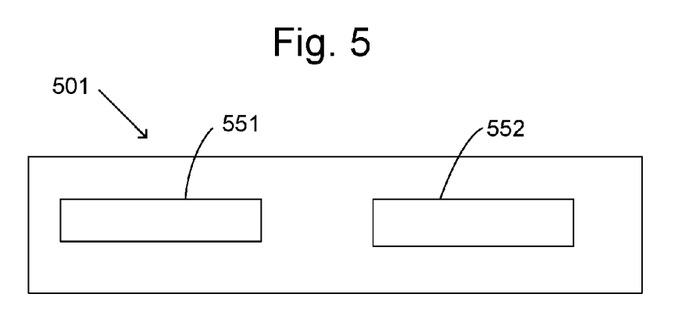
FIG. 5 shows schematically an example of a control unit of a deicing arrangement.

In FIG. 5 a control unit 501 is shown arranged to provide control signals for a de-icing arrangement. The control unit 501 may be a de-icing control unit aboard an aircraft. The control unit 501 may be a de-icing control unit of a wind power installation.

The control unit is arranged to select a capacitor set-up of the capacitive storage bank based on the desired distribution between mechanical power and heat provided by the electromagnetic actuators. The control unit is further arranged to determine an output voltage/current from the charging circuit based on the selected capacitor set-up so that the excitation pulse provided by means of said at least one selected capacitor has a predetermined maximum current/voltage peak. The control unit is also arranged to control the charging circuit to output the determined output voltage/current at charging of the capacitive storage bank. Thereby, irrespectively of the total capacitance of the capacitor(s) of the selected capacitor set-up, the control unit ensures that an excitation pulse will be provided which has enough mechanical power to break the ice and thus provide de-icing.

The control unit is arranged to control the selector for charging the selected at least one capacitance. In one example, wherein a sequence of excitation pulses are to be provided, the control unit may be arranged to control the selector for charging one or a plurality of capacitances selected for each pulse of the pulse sequence. Thereby, the capacitive storage bank can be arranged to store energy for a plurality of excitation pulses in different capacitors of the capacitive storage bank, wherein each pulse is associated to a selection of the capacitances.

The control unit is also arranged to control the selector for discharge of the selected at least one capacitance. In the example, wherein a sequence of excitation pulses are to be provided without re-charging, the control unit is arranged to control the selector for providing the excitation pulse for each pulse of the pulse sequence in accordance with a predetermined schedule.

The control unit 501 is arranged to control the above described first switch to close for controlling charging of the capacitive storage bank by means of the powered charging circuit and to adjust the output voltage/current to the determined voltage/current. When the selected capacitor(s) of the capacitive storage bank is charged, the first switch is opened.

At a timing of discharging of the selected capacitor(s), the control unit is arranged to control closing of the second switch so as to provide powering of the actuator(s). After discharge, the control unit 501 is again arranged to control the second switch to the open position again. In one example, the control unit 501 is arranged to control the second switch so that the capacitive storage bank is substantially discharged. In an alternative example, the control unit is arranged to control the second switch to open and close again a plurality of times before charging the capacitive storage bank again.

The control unit 501 is in one example arranged to control the second switch so that so as to abort the excitation pulse (p) at a predetermined timing (t_abort) after start of the excitation pulse. The predetermined timing may be selected so as to substantially coincide with the timing for a change of direction of the excitation pulse current. For example, the predetermined timing may be selected at the first change of direction of the current, when the discharge current curve characteristic for the selected capacitor set-up is under-damped.

The control unit 501 may be arranged for communication with a main mission computer of an aircraft or a central monitoring system computer of e.g. a wind power installation.

Further details of the control unit 501 are described in relation to the preceding figures.

The control unit 501 comprises one or a plurality of memories 551 and a data processing device 552. The memory or memories 551 may comprise a non-volatile memory and a read/write memory. The memory or memories 551 is arranged to store a computer program, such as an operating system, for controlling the function of the control unit.

Further, the control unit 501 may also comprise a bus controller, a serial communication port, I/O-means, an A/D-converter, a time date entry and transmission unit, an event counter and an interrupt controller (not shown).

The data processing device 552 may communicate with a data communications port by means of a data bus. The memory 551 is adapted for communication with the data processing device via a data bus. Signals and data relating to the operation of the de-icing arrangement may be received from the other parts of the control unit, from manual control, from sensors or from other processing units. The memory 551 is arranged to store the signals and data.

The data processing device 552 is set up to perform execution of code in a manner described herein. The processing device 552 is arranged to perform routines so as to de-ice the structural element.

Figures 6A, 6B:
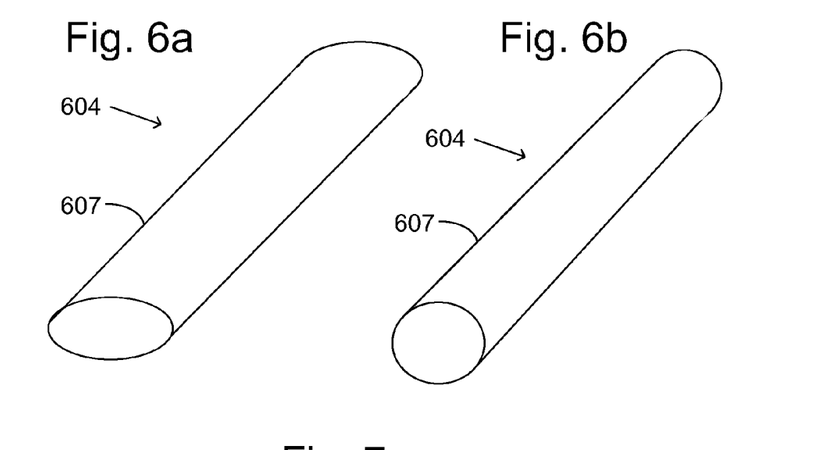
FIGS. 6a and 6b show an example of an electromagnetic actuator in a non-excited state and in an excited state.

In FIGS. 6a and 6b, the actuators are elongated flattened tubes 607 arranged to expand in one direction when fed with current. In FIG. 6a, the actuator is in its normal, flattened, non-current-fed state while in FIG. 6b, the actuator is fed with current. In the illustrated example the elongated tube becomes circular shaped when fed with current. In detail, the actuators have in one example conductive strips fabricated on a flexible dielectric sheet. The dielectric sheet is rolled into the flattened elongated tube such that the conductive strips are wound into coils with the axis of the winding coil coincident to the longitudinal axis of the elongated tube. The axis of the coil windings are in one example located substantially parallel to and beneath ice prone surfaces of the structural element. The interaction between the current in the windings of the coil results in an impulse electromagnetic force F or excitation that causes the coil to rapidly expand from its flattered shape to a substantially circular shape. This expansion in turn exerts an impulsive force on the surface of the flexible sheet which then distends and recoils, thereby expelling any ice accretions on the surface thereof. Once actuated the coil returns to its original shape due to the elasticity of the tube and due to the tension exerted inwardly by the flexible sheet.

Figure 7A:
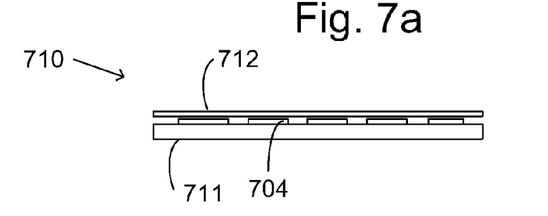
FIGS. 7a and 7b show an example of a structural element with an electromagnetic actuator in a non-excited state and in an excited state.
Figure 7B:
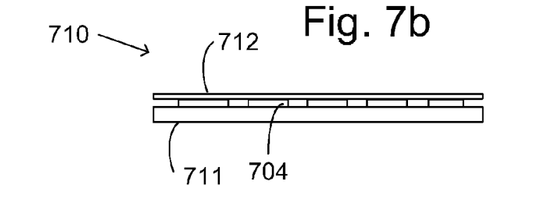

In the exemplary embodiment of FIG. 7, a structure element 710 comprises a support structure 711 holding a plurality of actuators 704 and a flexible sheet 712. In FIG. 7a, no current is fed to the actuators. In this state, no force or only a static force acts on the flexible sheet 712. In FIG. 7b, an excitation pulse has been fed to the actuator. In this state, the actuators apply an impulse force on the flexible sheet 712.

Figure 8:
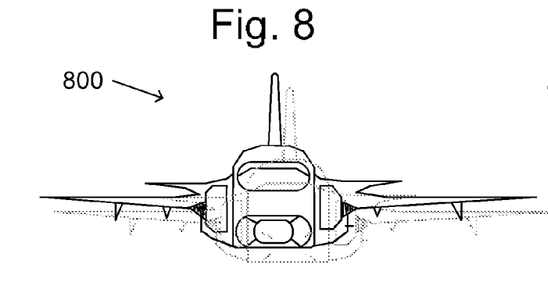
FIG. 8 shows a front view of an aircraft having one or a plurality of de-icing arrangements

In the exemplary embodiment of FIG. 8, a platform in the form of an aircraft 800 comprises at least one structural element arranged with the de-icing arrangement as described above. The construction element comprises in one example a metal such as aluminium or an alloy thereof. In one example, the construction element is a part of a wing or fuselage of an airborne vehicle such as an airplane. Furthermore, the de-icing arrangement could be adapted to curve parts of wings, fuselage, engine air intake or any other point at which ice accretion is formed. Each construction element is provided with one or a plurality of de-icing elements as described above. The aircraft may be a fighter, bomber, surveillance aircraft, or a combination thereof. The aircraft may be a commercial aircraft. The aircraft may be engine powered or a glider. The aircraft may be manned or unmanned, e.g. an UAV (Unmanned Aerial Vehicle). The aircraft may be fixed-wing, ornithopter, rotary wing or a combination thereof. The platform may alternatively be a satellite, space-shuttle, rocket or missile.

In the example of FIG. 8 relating the aircraft 800, the de-icing arrangement(s) is mounted within the airfoil, i.e. the structural element, of an airframe. In using the tube with coil windings as described above, the axis of the coil windings may be located substantially parallel to and beneath ice prone surfaces of an airfoil, such as the leading edges.

Figure 9:
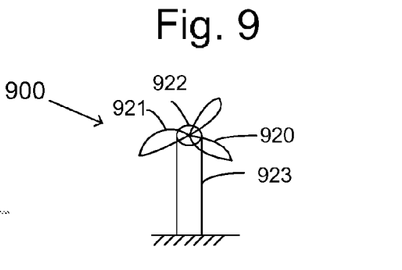
FIG. 9 shows a front view of a wind power plant having one or a plurality of de-icing arrangements.

In the exemplary embodiment of FIG. 9, a platform in the form of a wind power plant 900 comprises at least one structural element arranged with the de-icing arrangement as described above. The wind power plant has a wind turbine 920 having a plurality of blades 921, wherein each of the blades 921 is provided with at least one de-icing arrangement as described above. The blades 921 are arranged to rotate around a hub 922. A base 923 is supporting the wind turbine 920. The wind turbine is in one example mounted on a land based or sea based power plant. Other features, such as generator, gear box and control units are not shown in the figure for reasons of clarity. A rotor diameter of the wind power installation may be up to 120 meters. However, any suitable rotor diameter may be used such as 50 meters or 75 meters. Wind power installations may suffer from ice accretion on e.g. the blades 921. Ice accreted on the blades in general has a negative impact on the performance of the wind power installation.

In a situation where adhered ice is covering at least a part of one blade, shear forces at the hub causes impaired operation and an increased risk of shut down or, in severe cases, a breakdown of the wind power installation. Conventional de-icing systems may require more power than the wind turbine generates. According, during weather conditions wherein ice is formed, power plants are today usually not in service. The de-icing arrangement as described herein would require less power than is produced by the wind turbine on which it is installed. Further, the de-icing events, i.e. the timing of the excitation pulses can be selected so that the ice which comes off due to the force applied to the structural element is falling to the ground within a predetermined zone on the ground.

Figure 10:
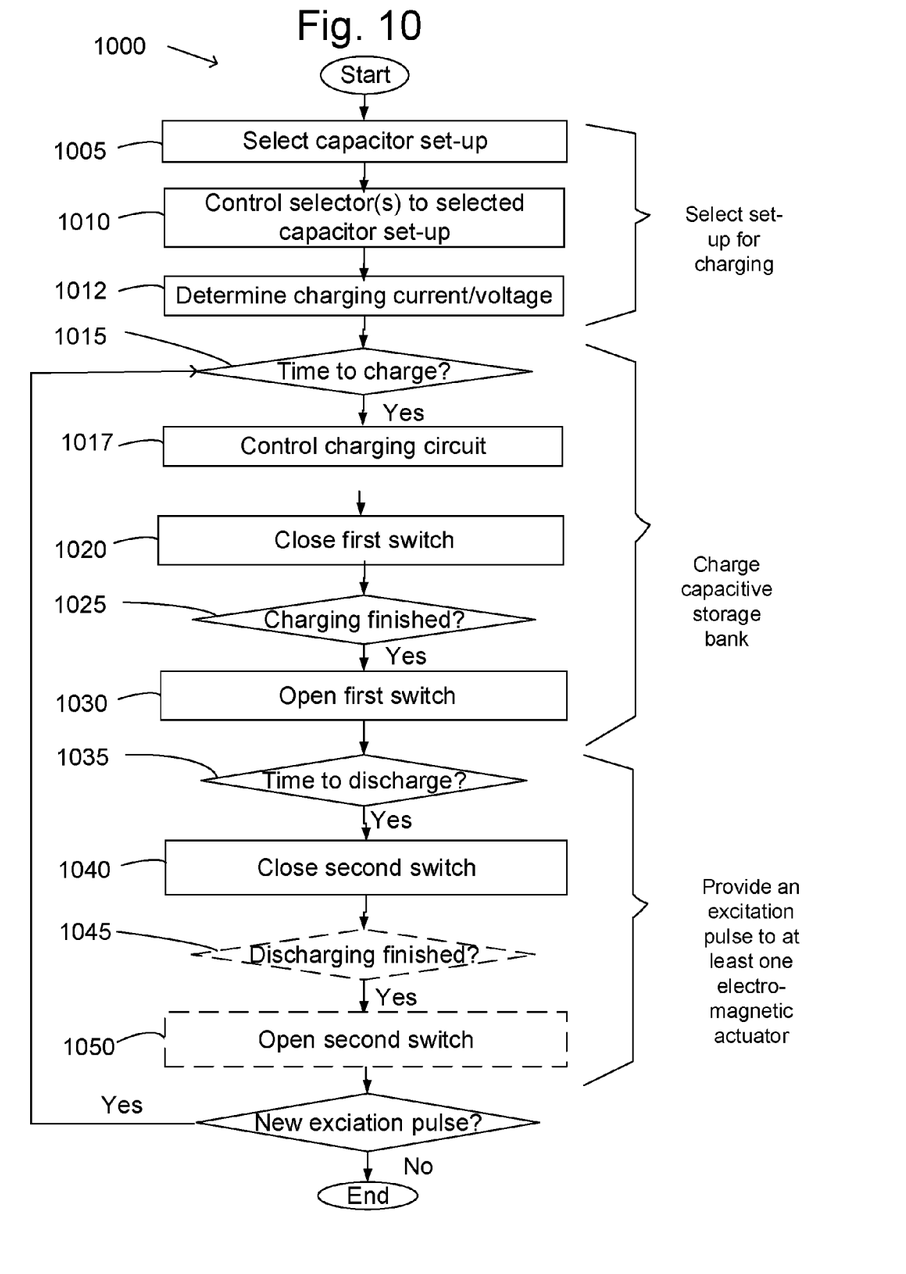
FIG. 10 is a flow chart illustrating an example of a method for de-icing a structural element.

In FIG. 10, a method 1000 for de-icing a structural element comprises the steps of selecting a set-up for the capacitive storage bank for providing one or a plurality of excitation pulses having desired characteristics to at least one electromagnetic actuator, charging the capacitive storage bank in accordance with the selected set-up, and discharging the capacitive storage bank, so as to provide one or a plurality of excitation pulses.

In the illustrated example, selection of a set-up for the capacitive storage bank, comprising a plurality of selectable capacitors of different capacitance, comprises selecting 1005 a capacitor set-up comprising at least one capacitor for charging. The selected capacitor set-up has a capacitance such that current discharge of the capacitive storage bank giving rise to the excitation pulse into the at least one electromagnetic actuator generates a desired distribution between heat and mechanical power. The selection is for example based on at least one of the following parameters: temperature, humidity, ice thickness at the structural element, ice thickness growth, speed and altitude. One or a plurality of selectors of the capacitive storage bank is then controlled 1010 so as to provide the selected capacitor set-up to enable electrical connection between the selected capacitor(s) of the capacitive storage bank in accordance with the selected set-up and the charging circuit alternatively between the selected capacitor(s) of the capacitive storage bank in accordance with the selected set-up and the electromagnetic actuator(s).

Thereafter, in a next step, an output voltage/current from the charging circuit is determined 1012 based on the selected capacitor set-up comprising at least one capacitor so that the excitation pulse provided by the capacitive storage bank has a predetermined maximum current/voltage peak. In one example, some of the above steps are performed in parallel or in an alternative order.

Thereafter it is determined whether charging 1015 of the capacitive storage bank is scheduled. If so, the method proceeds to the step of charging the capacitive storage bank. The charging involves in a first step controlling 1017 the charging circuit for output of the determined output voltage/current and electrically connecting 1020 the charging circuit to the capacitive storage bank. The latter is in the illustrated example performed by closing the first switch as discussed in relation to FIG. 3. When it has been determined that charging is finished 1025, the electrical connection is disconnected 1030. The disconnection is in the illustrated example performed by opening the first switch. In one example, it is determined that charging is finished based on timing information. The timing information may comprise a predetermined charging time for charging the capacitive storage bank. Alternatively, the timing information may comprise an alert that the charging circuit is to be used for charging another capacitive storage bank. In an alternative example, it is determined that charging is finished based on information related to a charging state of the capacitive storage bank. In accordance with the last mentioned example, equipment is provided for measuring the charging state of the capacitors of the capacitive storage bank.

After charging of the capacitive storage bank, one or a plurality of desired excitation pulses are provided to at least one electromagnetic actuator. The at least one electromagnetic actuator is then expanded in at least one direction in response to the received excitation pulse. The at least one electromagnetic actuator is arranged in an abutting relation to the structural element so as to, when expanded, apply a force on the structural element. In the illustrated example, the providing of the excitation pulse provides a first step of awaiting a timing 1035 for discharge of the selected capacitor(s) the capacitive storage bank. At the timing of the discharge, an electrical connection is provided 1040 between the capacitive storage bank and the at least one electromagnetic actuator. After discharge, the electrical connection between the capacitive storage bank and the at least one electromagnetic actuator is disconnected 1050. In the illustrated example, the electrical connection/disconnection is performed by means of a second switch as discussed in relation to FIG. 3. In one example it is determined that the discharge is finished 1045 based on timing information. The timing information comprises in one example a predetermined discharging time for discharge of the capacitive storage bank. The timing information is in one example chosen to abort the pulse. The predetermined timing may be selected so as to substantially coincide with the timing for a change of direction of the excitation pulse current. The predetermined timing is in one example selected so as to substantially coincide with the timing for a first change of direction of the excitation pulse current.

It is thereafter determined whether a new excitation pulse is desirable. If a new excitation pulse is desirable, the method jumps back to the steps 1015, 1017, 1020, 1025, 1030 for charging the capacitive storage bank. In the illustrated example, the method jumps back to step 1015 of awaiting scheduled charging. If it is determined that another excitation pulse is desirable, but with another set-up of the capacitive storage bank, the method jumps in accordance with a not illustrated example back to the steps 1005, 1010, 1012 of selecting set-up for the capacitive storage bank. In one example, it is assumed that the capacitive storage bank is completely discharged when the selector(s) are controlled to the selected capacitor set-up in step 1010. The selectors need not be designed for operating at high voltages in this example. In one example, the decision for selecting a new set-up for charging is made while the capacitive storage bank is charged. Then, in one example the capacitive storage bank has to be discharged before performing the steps of selecting set-up for charging. Alternatively, the selectors are designed to be operated while powered. If it determined that a new excitation pulse is not desirable, the method ends.

The invention claimed is:

1. A de-icing arrangement for de-icing a structural element, the de-icing arrangement comprising:
   at least one electromagnetic actuator;
   a capacitive storage bank comprising a plurality of capacitors;
   a control unit arranged to provide an excitation pulse to the at least one electromagnetic actuator; and
   a charging circuit arranged to charge the capacitive storage bank,
   wherein the at least one electromagnetic actuator is arranged to expand in at least one direction when fed with the excitation pulse, wherein the at least one electromagnetic actuator is arranged in relation to the structural element so as to apply a mechanical force caused by the expansion on the structural element, wherein the capacitive storage bank comprises a plurality of selectable capacitors of different capacitance, and wherein the control unit is arranged to select at least one capacitor for charging having a total capacitance such that a current discharge of the capacitive storage bank into the at least one electromagnetic actuator generates a desired distribution between heating of the electromagnetic actuator and mechanical power.

2. The de-icing arrangement according to claim 1, wherein the control unit is arranged to determine an output voltage/current from the charging circuit based on the selected at least one capacitor so that the excitation pulse provided by the at least one selected capacitor has a predetermined maximum current/voltage peak and to control the charging circuit to output the determined output voltage/current.

3. The de-icing arrangement according to claim 1, wherein the control unit is arranged to control the charging of the capacitive storage bank for a plurality of consecutive excitation pulses provided during a predetermined time period so that the at least one electromagnetic actuator generates the desired distribution between heating of the electromagnetic actuator and mechanical power.

4. The de-icing arrangement according to claim 1, wherein the control unit is arranged to select capacitors based on at least one of the following parameters: temperature, humidity, ice thickness at the structural element, ice thickness growth, speed and altitude.

5. The de-icing arrangement according to claim 1, wherein the structural element comprises a base forming a support for the at least one electromagnetic actuator and a flexible skin, and wherein the at least one electromagnetic actuator is arranged in relation to the flexible skin so as to apply the force on the flexible skin at the expansion.

6. The de-icing arrangement according to claim 1, wherein the control unit is arranged to control current discharge of the capacitive storage bank into the at least one electromagnetic actuator so as to abort the excitation pulse at a predetermined timing after start of the excitation pulse.

7. The de-icing arrangement according to claim 6, wherein the predetermined timing is selected so as to substantially coincide with the timing for a change of direction of the excitation pulse current.

8. The de-icing arrangement according to claim 1, wherein the control unit is arranged to operate in at least two modes of operation, wherein a first operational mode comprises performing de-icing mainly mechanically utilizing the excitation pulse and a second operational mode comprises performing de-icing mechanically and thermally, wherein the second operational mode comprises heating the structural element utilizing the electromagnetic actuator.

9. The de-icing arrangement according to claim 8, wherein the first operational mode comprises selecting a set of capacitances having smaller total resulting capacitance than in the second operational mode.

10. A structural element, comprising:
    at least one de-icing arrangement comprising
      at least one electromagnetic actuator,
      a capacitive storage bank comprising a plurality of capacitors,
      a control unit arranged to provide an excitation pulse to the at least one electromagnetic actuator, and
      a charging circuit arranged to charge the capacitive storage bank,
      wherein the at least one electromagnetic actuator is arranged to expand in at least one direction when fed with the excitation pulse, wherein the at least one electromagnetic actuator is arranged in relation to the structural element so as to apply a mechanical force caused by the expansion on the structural element, wherein the capacitive storage bank comprises a plurality of selectable capacitors of different capacitance, and wherein the control unit is arranged to select at least one capacitor for charging having a total capacitance such that a current discharge of the capacitive storage bank into the at least one electromagnetic actuator generates a desired distribution between heating of the electromagnetic actuator and mechanical power.

11. The structural element according to claim 10, wherein the structural element comprises a base forming a support for the at least one electromagnetic actuator and a flexible skin, and wherein the at least one electromagnetic actuator is arranged in relation to the flexible skin so as to apply the force on the flexible skin at the expansion.

12. The structural element according to claim 10, wherein the structural element comprises part of an aircraft.

13. The structural element according to claim 10, wherein the structural element comprises part of a wind power turbine.

14. A method for de-icing a structural element, the method comprising:
providing an excitation pulse to at least one electromagnetic actuator, whereby the at least one electromagnetic actuator is expanded in at least one direction in response to the received excitation pulse, and wherein the at least one electromagnetic actuator is arranged in an abutting relation to the structural element so as to, when expanded, apply a force on the structural element;
selecting at least one capacitor from a capacitive storage bank comprising a plurality of selectable capacitors having different capacitance; and
charging the selected at least one capacitor,
wherein providing an excitation pulse to at least one electromagnetic actuator comprises discharging the charged at least one capacitor into the at least one electromagnetic actuator, and
wherein the selecting comprises selecting at least one electromagnetic capacitor having a total capacitance such that the subsequent current discharge to provide the excitation pulse generates a desired distribution between heating of the electromagnetic actuator and mechanical power.

15. The method for de-icing a structural element according to claim 14, further comprising:
determining a charging current/voltage based on the selected at least one capacitor and based on information related to a desired peak current of the excitation pulse, wherein the charging of the selected at least one capacitor is performed with the determined charging current/voltage.

16. A computer program product, comprising:
a non-transitory computer readable element; and
computer program instructions recorded on the computer readable element and executable by a processor for carrying out a method for de-icing a structural element, the method comprising:
providing an excitation pulse to at least one electromagnetic actuator, whereby the at least one electromagnetic actuator is expanded in at least one direction in response to the received excitation pulse, and wherein the at least one electromagnetic actuator is arranged in an abutting relation to the structural element so as to, when expanded, apply a force on the structural element;
selecting at least one capacitor from a capacitive storage bank comprising a plurality of selectable capacitors having different capacitance; and
charging the selected at least one capacitor,
wherein providing an excitation pulse to at least one electromagnetic actuator comprises discharging the charged at least one capacitor into the at least one electromagnetic actuator, and
wherein the selecting comprises selecting at least one electromagnetic capacitor having a total capacitance such that the subsequent current discharge to provide the excitation pulse generates a desired distribution between heating of the electromagnetic actuator and mechanical power.

* * * * *